(12) United States Patent
Thibadeau, Sr.

(10) Patent No.: US 12,488,334 B2
(45) Date of Patent: Dec. 2, 2025

(54) METHOD AND SYSTEM FOR HARD CRYPTOWALLETS

(71) Applicant: Robert H. Thibadeau, Sr., Pittsburgh, PA (US)

(72) Inventor: Robert H. Thibadeau, Sr., Pittsburgh, PA (US)

(73) Assignee: Antique Books, Inc., Pittsburgh, PA (US)

( * ) Notice: Subject to any disclaimer, the term of this patent is extended or adjusted under 35 U.S.C. 154(b) by 213 days.

(21) Appl. No.: 18/224,708

(22) Filed: Jul. 21, 2023

(65) Prior Publication Data

US 2024/0029057 A1 Jan. 25, 2024

Related U.S. Application Data

(60) Provisional application No. 63/391,267, filed on Jul. 21, 2022.

(51) Int. Cl.
*G06Q 20/36* (2012.01)
*G06F 21/62* (2013.01)
*G06Q 20/38* (2012.01)

(52) U.S. Cl.
CPC ..... *G06Q 20/3678* (2013.01); *G06F 21/6218* (2013.01); *G06Q 20/3674* (2013.01);
(Continued)

(58) Field of Classification Search
CPC ............ G06F 21/6218; G06Q 20/3674; G06Q 20/3678; G06Q 20/3821; G06Q 20/3829; G06Q 2220/00; H04L 9/50
See application file for complete search history.

(56) References Cited

U.S. PATENT DOCUMENTS

| | | | |
|---|---|---|---|
| 11,803,842 B2* | 10/2023 | Mamoni | H04L 9/085 |
| 2015/0287026 A1* | 10/2015 | Yang | G06Q 20/065 |
| | | | 705/69 |

(Continued)

OTHER PUBLICATIONS

Author Unknown, "TCG Storage Architecture Core Specification," Specification Version 2.01, Revision 1.00, Aug. 5, 2015, Trusted Computing Group, Incorporated, 306 pages.

(Continued)

*Primary Examiner* — Mohamed A. Wasel
(74) *Attorney, Agent, or Firm* — Withrow + Terranova, PLLC

(57) ABSTRACT

Wallets for cryptocurrencies and other digital currencies combine multiple digital currency accounts into a wallet and manage multiple other wallets. The accounts include accounts for different cryptocurrencies, different distributed finance accounts, different credit or debit cards, and different bank accounts. Multiple other wallets may be managed from a master wallet with more limited instances of the accounts, rules for authorization, wallet activation, location tracking, copying, and destruction rules under control of specific wallets managed ultimately by the master wallet. These capabilities fit in secure storage devices for cold hard storage of the master. Different wallet copies are distributed for other cold hard storage, hot hard storage, cold soft storage or hot soft storage instances of these children wallets. With multiple wallets sharing subsets of functionality with respect to different wallet accounts, the usability, security, privacy, and versatility of wallets for digital currency is greatly improved over existing wallet offerings.

6 Claims, 7 Drawing Sheets

(52) U.S. Cl.
CPC ..... *G06Q 20/3821* (2013.01); *G06Q 20/3829* (2013.01); *G06Q 2220/00* (2013.01)

(56) References Cited

U.S. PATENT DOCUMENTS

| | | | |
|---|---|---|---|
| 2022/0051240 A1* | 2/2022 | Shamai | G06Q 20/405 |
| 2022/0101308 A1* | 3/2022 | So | G06Q 20/10 |
| 2023/0037520 A1* | 2/2023 | Tola | H04L 63/126 |

OTHER PUBLICATIONS

Thibadeau, Robert, "Flashy Crypto," medium.com/liecatcher/flashy-crypto-60107ddd84f, Jul. 19, 2022, 36 pages.

* cited by examiner

Self-Encrypting-Drive (SED) Security Subsystem
Types Have Two SPs

1 Admin SP Drive Manager
　　Tables
　　Methods

2 Locking SP Self-Encryption Management
　　Tables
　　Methods

*FIG. 2*

Crypto Enhanced SED Security Subsystem Type Drive
1 Admin SP Drive Manager
  Tables
  Methods
2 Locking SP Self-Encryption Management
  Tables
  Methods
3 CryptoWallet SP CryptoWallet Management
  Tables
  Methods

FIG. 3

Like SED Locking SP, the CryptoWallet SP Can be Activated on the device if You Have Possession of the Device.

FIG. 4

Special Contents of the CryptoWallet SP

- CryptoWallet Table
- Block Chain Account Table
- Authority Table Columns
  - Authority Friendly Name
  - Authority Globally Unique Identifier (GUID)
  - Authority Contact Email
  - Authority Contact SMS Address
  - Authority Phone Number
  - Authority Public Key
  - Authority Private Key Type (Unary Split Multisig)
  - Authority Private Key
  - Authority Wallet GUID
  - Authority Type (Master, Watcher, Approver, Reporter)

*FIG. 5*

Special Contents of the CryptoWallet SP

- Wallet Table Columns (Wallets in List)
  - Wallet Friendly Name
  - GUID – Globally Unique Master Wallet Name
  - GUID – Globally Unique Wallet Copy Name
  - OwnerID – Globally Unique Owner Information - Authority
  - Class – (Master, Watcher, Approver, Reporter, BlockChainProvider)
  - Soft-Hard – (Soft, Hard)
  - Hot-Cold – (Hot, Cold)
  - Transaction Reporting License KeyPairs
  - Last Synced Latitude Longitude (Date-Time)
  - Last Synced UTC Time/Date (Date-Time)
  - Type of Account (Block Chain, Bank, CreditCard, Other)
  - Account ID
- Block Chain Accounts Table (Block Chains in List)
- Authority Table (Users in List)
- Bank Accounts Table (Bank Accounts in List)
- Other Accounts Table (Other Accounts, e.g., NFTs accounts, in List)

*FIG. 6*

Special Contents of the CryptoWallet SP

- CryptoWallet Copies Table
- Block Chain Accounts Table Columns
  - Account Friendly Name
  - Account GUID
  - Authority GUID
  - Block Chain Identifier
  - Block Chain Address
  - Block Chain Public Key
  - Block Chain Private Key
  - Block Chain Recovery String/Phrase Verifier
  - Account Type (Direct, Custodial, Watcher)
  - Recovery Code Verifier
- Authority Table

*FIG. 7*

METHOD AND SYSTEM FOR HARD CRYPTOWALLETS

RELATED APPLICATIONS

This application claims the benefit of provisional patent application Ser. No. 63/391,267, filed Jul. 21, 2022, the disclosure of which is hereby incorporated herein by reference in its entirety.

FIELD OF THE DISCLOSURE

This invention relates generally to wallets that hold and manage digital currency of all kinds including but not limited to cryptocurrency.

BACKGROUND

Cryptocurrencies and other forms of digital currency including but not limited to conventional credit cards, debit cards, and online banking and payment, need new forms of wallets where the owner of the currency can manage and protect his assets across a much wider number of use-cases than is currently available in digital wallets.

FIG. 1 shows the basic concepts of wallets (a) in the cryptocurrency world. These concepts apply equally well to all types of digital currency. A currency account is managed by public-private key pairs (b) on block chains (c) or other database constructs. In addition to public and private keys, there are properties (d) governing how the stored currency may be used. Passwords and Recovery Codes (e) are available for different Wallets and Wallet Accounts. There are HOT wallets (f) which perform wallet storage and transactions in the cloud. In some cases, the HOT wallets are managed by distributed finance organizations or merchants in addition to the database providers such as the block chain owners. There are also COLD wallets (g) in endpoints which may include Soft Wallet (h) software in a smart phone or Hard Wallets (i) in specialized endpoint hardware.

There is a need for a universal wallet that provides additional services for all HOT/COLD HARD/SOFT wallets aside from the functions currently provided in the commercial marketplace.

SUMMARY

A single individual digital currency wallet should manage many accounts including but not limited to cryptocurrency accounts, credit card accounts, bank accounts. This wallet needs to manage the currency in these accounts. This wallet should have HOT or COLD, SOFT or HARD copies each with express uses. A central use in a system of such wallets is a master which has all the rights and obligations of an originating wallet. Along with a master, the inclusion of special use child wallets constitutes a system of such wallets described by the present invention. These include Wallets "find my wallets" functions similar to those seen in many smart phones today, wallets with a subset of currency accounts from the Master, authorization properties to approve transactions wallet currency accounts, COLD backups that require authorization to be made HOT or to be moved or copied from a HARD location, and forensic logging on actions on all wallets.

The present invention proposes to utilize existing industry standards for HARD COLD security enhanced wallets to achieve these functions. The other types (HARD HOT, SOFT COLD, SOFT HOT) implement exactly the same functions but with fewer security assurances. The MASTER wallet should be HARD COLD while different subordinate wallets to this MASTER may be of any of the four types, under management control of the MASTER.

The particular industry HARD COLD standard chosen is one of many that could be chosen to provide the basic framework for such a universal digital wallet and its subordinate wallets and corresponding accounts.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 2 illustrates that each "Storage Subsystem Class" (SSC) has two Security Providers built into the Drives.

FIG. 3 illustrates a novel CryptoWallet SP according to some embodiments of the current disclosure.

FIG. 4 illustrates activating a new flash or other storage device that can be used as a CryptoWallet SSC.

FIG. 5 illustrates a CryptoWallet SP that includes a table that describes the legitimate users, called "Authorities" on that wallet.

FIG. 6 illustrates a Wallets Table that would keep track of all the Wallet copies and their authentication credentials needed to securely synchronize with instructions from a master wallet.

FIG. 7 illustrates an example of some special contents of the CryptoWallet SP.

DETAILED DESCRIPTION

Figure 1:
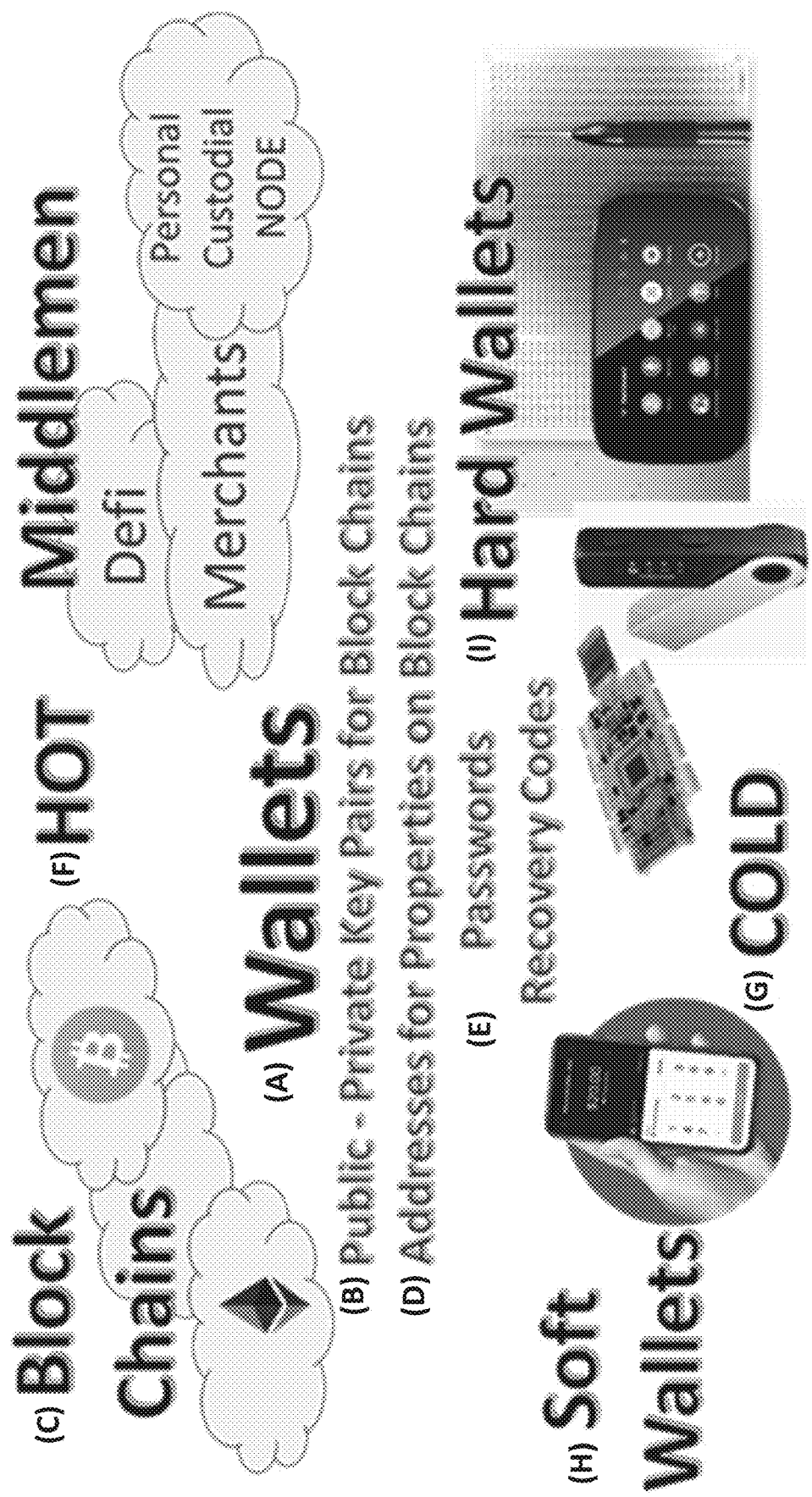
FIG. 1 shows the basic concepts of wallets (a) in the cryptocurrency world.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The HARD COLD wallet definition in the present embodiment is an implementation of the standard for self-encrypting storage devices offered by The Trusted Computing Group at www.trustedcomputinggroup.org. This standard explicitly allows unanticipated subsidiary standards such as the one proposed in the present invention.

A Master wallet forms the basis for a system of wallets which includes the HARD master and other HARD and SOFT wallets selected among the methods and content of the HARD master.

The methods and content of the HARD COLD master provide the following functions.

1. The master wallet keeps track of all wallet accounts and child or other master wallets in a system of wallets based on the master. The master wallet has its own block chain for managing wallet accounts and child or other wallets in the system as well as performing transactions with other master wallet systems.

2. A Find My Wallet method that can locate and synchronize methods and content with some or all of the wallets in the master wallet system.

3. A Watcher Wallet. This Wallet configuration does not have the ability to perform currency transactions. It doesn't have Wallet account private transaction keys on it. It simply has the ability to watch my transactions and potentially be called on to approve them.

4. A Wallet copy function managing copies of the Master Wallet along with conditions under which such copies can be created, activated, deactivated or retired within the system.

5. Forensic logging methods for all wallet accounts and wallets in the system.

6. Multi-wallet approval of account and wallet transactions by way of split key methods. In the simplest version of split key, half the key is in one copy of a wallet, and half in another copy of the wallet.

7. Such key splitting is safest if the keys are split by a series of key splits that are XORed together to give the effective key. This method requires a list of approver copies to permit an account currency or wallet management transaction.

8. A type of split key can use a different method type of split key called Shamir key sharing. Shamir key sharing notes that the split keys can be the x,y values for a function where the effective key is the y value intersection of a polynomial function at x=0. This method implements any specified number of two to N approver authorities can recover the effective key. With higher order polynomial curves Shamir can require any three, or four, wallets from a larger set must all approve.

9. The key splitting method allows implements combining these two types of key splitting: XORed key splits with Shamir Key splitting. This permits advanced "Multisig" for "multisignature" currency accounts and wallet management. For example, two signature approvals are always required and one approval from three other options. The signature method also allows a stipulating mix of who must be contemporaneously present and how many of the optional people must present to approve, too.

10. A type of wallet copy that is HARD and COLD without any account or wallet management capability so that untrusted parties can hold copies of it.

11. A method for Splitting Recovery Words for Block Chain Wallet Accounts. Twelve to twenty-four word recovery strings are often required for cryptocurrency wallet accounts. There is usually a list of 2048 words from which the words in the twelve to twenty-four word recovery strings are chosen. The order of the words counts. These recovery strings provide a means to restore a wallet account or create a copy of the account on the new wallet by restoring its private key.

13. A method for a "pseudo random number generator" to generate private keys. The recovery key is just an address into that generator to use a private key which is, effectively, the Nth key that that generator can generate.

14. A method for loan transactions with other wallet systems. This includes keeping track of interest and payments in a wallet loan account that includes payment transactions that can be automated or made manually.

The preferred embodiment utilizes The Trusted Computing Group (TCG) Storage Core Specification for any HARD wallet. This global industry standard specification is included by reference and available from www.trustedcomputinggroup.org. Other existing security services from physical devices can implement can also provide identical functional platforms for the novel HARD/SOFT HOT/COLD Wallets additionally implemented for the present invention.

All TCG storage product specifications are based on the TCG Core Specification that provides the details of implementation of basic security, access, and content management and storage services called "SPs". The Core provides for a definition of new and novel SPs that any given new type of "Storage Subsystem Class" (SSC) can choose to implement. The Core also provides the means defining such novel and new SPs and SSCs. These means are employed in the preferred embodiment of the present invention.

Two such SSC classes have already been widely implemented under the Core and in use worldwide. These include the "Opal" and the "Enterprise" specifications. In addition, a number of companies worldwide have developed other SSCs and implemented them on a proprietary basis. The present invention is for a "Cryptowallet SSC" which would specify a storage device be the present systems of HARD/SOFT COLD/HOT digital wallets for managing digital currency accounts and the wallet systems managed by a master wallet.

Under the core standard, each SP is defined as one or more SQL-style table of columns and rows, and a set of methods for manipulating labelled values inside each table. To design the present digital Wallet under the standard, we need only to specify the different SPs, their tables, and how they function and interact.

Supporting functional components of the present invention may be found in the Core Specification. These include security related details for managing wallets, access and authorization key pairs, properties, passwords as well as managing security controls around wallet accounts.

All SSCs have two Security Providers built into the Drives (as shown in FIG. 2).

The existing Opal and Enterprise Drive specifications have an Admin SP and a Locking SP. The Admin SP manages information about the HARD drive itself, as a device. The Locking SP manages information about the encryption of user data ranges, or partitions, on the drive.

In the present embodiment, the novel CryptoWallet SP is shown in FIG. 3. The CryptoWallet SSC would additionally have this CryptoWallet SP.

When you buy a new flash or other storage device that can be used as a CryptoWallet SSC, you simply activate it the same way people activate TCG SSCs requiring possession of the device today shown in FIG. 4.

FIG. 5 shows the CryptoWallet SP. This SP includes a table that describes the legitimate users, called "Authorities" on that wallet. These authorities would include the owner or owners of the wallet that have the right to perform block chain transactions, and other users that may have restricted rights of approval and viewing.

The rows of that table are the various users and the columns define the limits of each user's rights. Watcher and Approver wallets may have users that cannot alter much of the content on these wallets but may be required to give permission for transactions on certain wallet currency accounts.

Another table in this CryptoWallet SP would list all block chain or other digital currency accounts managed by this CryptoWallet including which account, a familiar name for it, its type for example whether it is a cryptocoin account or another digital currency account, which block chain, the hash for the password for the account, the public key, the private key, the address of the coin or token in the block chain, a hash of the recovery phrase key to reconstruct the private key, and what users have what multisig roles on performing a block chain transaction on the account.

Another table, the Wallets Table in FIG. 6 would keep track of all the Wallet copies and their authentication credentials needed to securely synchronize with instructions from a master wallet.

The Wallet Table can also list every other Wallet and Wallet Copy associated with the CryptoWallet Authority. The user will see his Master Wallet, perhaps a cold backup of his Master Wallet, all the limited copies he has made of his Master such as Watchers, Approvers, Reporters, and BlockChainProvider copies, where these Wallets are, whether they are soft or hard, hot or cold, and who the Authorities are that are the custodians of these copies his wallet.

The user will also see any copies of other people's Wallets for which he is a custodian, as a Watcher, Approver, Reporter, or BlockChain Provider. The user will see where his copies are. Whether they are cold, hot, soft, or hard.

A Reporter is a special authority that may include the Government or Corporation who will now be fed anonymized reports of all currency transactions by this Master Wallet for monitoring the use of the wallet system.

An example of some special contents of the CryptoWallet SP is shown in FIG. 7. Each master wallet would have its own block chain. This is the 'fast' kind of block chain that has no proof of work or proof of stake. It is managed by the person who owns the Master Wallet on this Hard CryptoWallet.

A Wallet then not only has a list of all the copies of it that have been made, but also an optional list of all the copies of other people's wallets also being held custodially. Different kinds of such copies, for example, Watcher wallets and Approver wallets will prohibit copying. For example, if an Approver wallet is lost, the Master Wallet holder can mark it lost and create a new one.

The master wallet and backup masters for a system may generally required to be a COLD HARD Wallet and may be air-gapped except when other wallets in the system cannot perform specific functions.

Custodian such as DeFi services (FIG. 1g) could receive restricted versions of a master Wallet which only refer to accounts they have a right to manage as seen in my CryptoWallet as well as theirs as a custodian of my assets.

All authorized copies of the Wallet that could be stored in the local block chain in FIG. 6 or similar public key database managed on any of the user's master wallet storage devices. This would provide a coherent basis for how the collection of copies of the user's wallet can be found and understood to be legit. A backup master wallet device simply requires a configuration of split key approvers to replace the primary Master if it is ever lost.

Those skilled in the art will recognize improvements and modifications to the preferred embodiments of the present disclosure. All such improvements and modifications are considered within the scope of the concepts disclosed herein and the claims that follow.

What is claimed is:

1. A physical digital currency wallet with variant authorized and managed physical copies based on a storage device comprising:
a memory; and
computing circuitry operable to:
provide advanced data and program protection for data stored in a plurality of storage ranges in the memory, including providing:
data-at-rest protection for the data;
data-in-motion protection for the data; and
data-in-use protection for the data;
configure one or more storage ranges in the plurality of storage ranges as including one or more read-only ranges for executable tools by a host computer;
configure the one or more storage ranges in the plurality of storage ranges as including one or more write-only ranges for forensic logging;
where the memory comprises authentication credentials for using the one or more storage ranges on the storage device which are independent of the authentication credentials for normal operation of the host computer;
where the authentication credentials for using the plurality of storage ranges comprises one or more of the group consisting of:
authentication credentials for provisioning access to the one or more storage ranges; and
authentication credentials for accessing the one or more storage ranges.

2. The physical digital currency wallet of claim 1 wherein the computing circuitry is further operable to: configure the one or more storage ranges including one or more intermittently read-only or write-only ranges for storing digital currency wallet accounts in different forms including but not limited to read only host software to support the functionality of the device, account access information, account balances, account transactions, account public keys, account private keys, recovery phrases, account forensic logs, and account wallet authorization requirements.

3. The physical digital currency wallet of claim 1 wherein the computing circuitry is further operable to: configure the one or more storage ranges including one or more intermittently read-only or write-only ranges for storing digital currency wallets including exact wallet copies, subsidiary wallets with less operational scope over accounts than a parent wallet.

4. The physical digital currency wallet of claim 1 wherein the computing circuitry is further operable to: configure the one or more storage ranges including one or more intermittently read-only or write-only ranges for storing information about other digital currency wallets.

5. The physical digital currency wallet of claim 1 wherein the computing circuitry is further operable to: configure the one or more storage ranges including one or more intermittently read-only or write-only ranges for find-my-wallet capabilities which may find all wallets it is authorized by wallet owners or authorized wallets to find.

6. The physical digital currency wallet of claim 1 wherein a storage device wallet comprises one of the group consisting of:
an attached storage device using Universal Serial Bus, USB, or other attached storage protocols;
a secondary internal storage device using internal host computer storage protocols;
a network attached storage device using network attached storage protocols; and
a software emulator in a phone, PC, or server.

* * * * *